United States Patent
Xiong et al.

(10) Patent No.: US 10,397,895 B2
(45) Date of Patent: Aug. 27, 2019

(54) RANGE FINDING BASE STATION SELECTION METHOD AND APPARATUS

(71) Applicant: UBTECH Robotics Corp, Shenzhen (CN)

(72) Inventors: Youjun Xiong, Shenzhen (CN); Yongsheng Zhao, Shenzhen (CN); Zhichao Liu, Shenzhen (CN)

(73) Assignee: UBTECH Robotics Corp, Shenzhen (CN)

( * ) Notice: Subject to any disclaimer, the term of this patent is extended or adjusted under 35 U.S.C. 154(b) by 0 days.

(21) Appl. No.: 16/161,086

(22) Filed: Oct. 16, 2018

(65) Prior Publication Data

US 2019/0124618 A1    Apr. 25, 2019

(30) Foreign Application Priority Data

Oct. 23, 2017 (CN) .......................... 2017 1 0991805

(51) Int. Cl.
*H04W 64/00* (2009.01)
*H04W 48/20* (2009.01)
*G01S 5/02* (2010.01)
*G01S 5/00* (2006.01)

(52) U.S. Cl.
CPC ......... *H04W 64/003* (2013.01); *G01S 5/0036* (2013.01); *G01S 5/021* (2013.01); *G01S 5/0278* (2013.01); *H04W 48/20* (2013.01)

(58) Field of Classification Search
CPC ... H04W 64/003; H04W 48/20; G01S 5/0036; G01S 5/021; G01S 5/0278
See application file for complete search history.

(56) References Cited

U.S. PATENT DOCUMENTS

| | | | |
|---|---|---|---|
| 9,942,815 B1* | 4/2018 | Govindassamy ... | H04W 64/003 |
| 2012/0190380 A1* | 7/2012 | Dupray ................... | G01S 1/026 455/456.1 |
| 2014/0145829 A1* | 5/2014 | Bassan-Eskenazi .... | G01S 11/02 340/10.1 |
| 2014/0148195 A1* | 5/2014 | Bassan-Eskenazi .... | G01S 11/02 455/456.1 |
| 2015/0282112 A1* | 10/2015 | Bialer ....................... | G01S 1/02 455/456.1 |
| 2016/0088490 A1* | 3/2016 | Servais ................. | H04W 16/18 455/446 |
| 2016/0119758 A1* | 4/2016 | Liu ......................... | H04W 4/02 455/456.5 |
| 2017/0227625 A1* | 8/2017 | Markhovsky ........... | G01S 1/042 |

* cited by examiner

*Primary Examiner* — Shahriar Behnamian

(57) ABSTRACT

The present disclosure provides a range finding base station selection method and apparatus. The embodiments of the present disclosure are capable of eliminating the inappropriate base stations, so that the range finding from the base station to the tag can be accurate, thereby improving the accuracy of tag positioning.

16 Claims, 7 Drawing Sheets

| Take the sixth base station group as a new fifth base station group, if an amount of the base stations in the sixth base station group is larger than the second preset base station amount | — S301 |

↓

| Re-execute the steps of determining any one of the base stations in the fifth base station group as a target base station; determining a coordinate of a virtual tag by using a preset algorithm based on all the non-target base stations in the fifth base station group; obtaining a virtual distance of a coordinate of the target base station to the virtual tag, and obtaining a fourth distance of the target base station to the pending tag; obtaining an outlier determination value of an absolute value of a difference between the fourth distance and the virtual distance of the target base station; obtaining an outlier determination value of the target base station having the largest outlier determination value among all the target base stations in the fifth base station group; and discarding the target base station having the largest outlier determination value exceeding a third preset range to obtain a sixth base station group, if the outlier determination value of the target base station having the largest outlier determination value exceeds the third preset range | — S302 |

FIG. 6

RANGE FINDING BASE STATION SELECTION METHOD AND APPARATUS

CROSS REFERENCE TO RELATED APPLICATIONS

This application claims priority to Chinese Patent Application No. 201710991805.0, filed Oct. 23, 2017, which is hereby incorporated by reference herein as if set forth in its entirety.

BACKGROUND

1. Technical Field

The present disclosure relates to communication technology, and particularly to a range finding base station selection method and apparatus.

2. Description of Related Art

Whenever positioning a tag in a wireless system, the signal flight time of a base station had been coordinated (positioned) and the tag is measured so as to calculate the distance from the base station to the tag, and then the coordinate of the tag is obtained according to the distances from different base stations to the tag, thereby positioning the tag.

In the prior art, if generally selects all the base stations that have successfully finding range with respect to the tag as the base stations for finding range. However, if the inadequate base stations are selected, the accuracy of the range finding from the base station to the tag will be affected, which affects the accuracy of tag positioning.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

FIG. 6 is a flow chart of still another embodiment of a range finding base station selection method according to the present disclosure.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

For the purpose of describing the technical solutions of the present disclosure, the following describes through specific embodiments.

Figure 1:
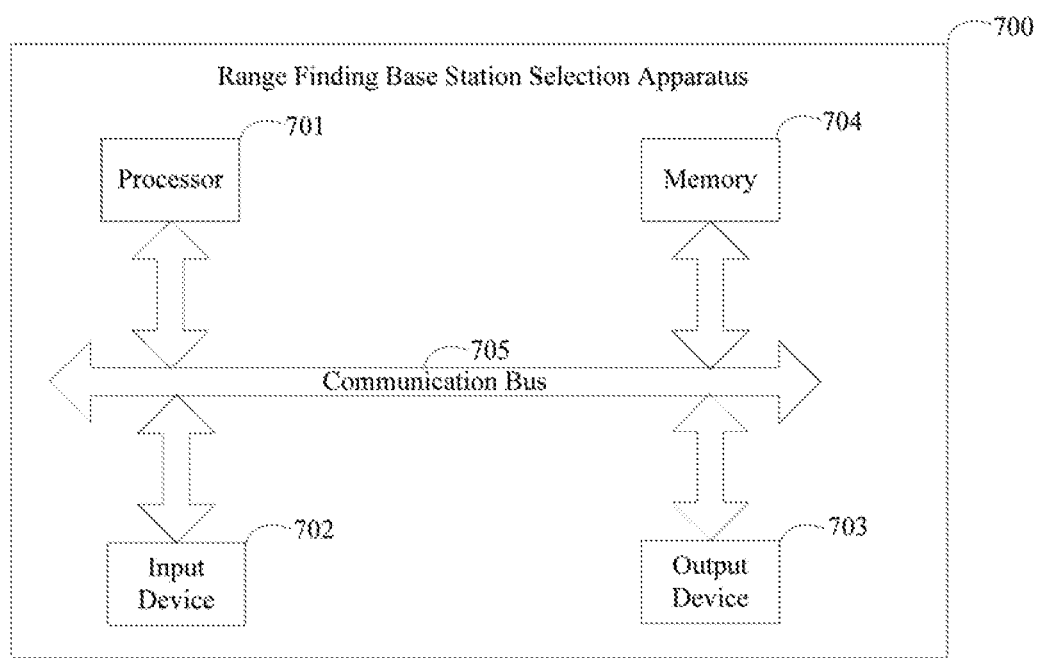
FIG. 1 is a schematic diagram of an embodiment of a range finding base station selection apparatus according to the present disclosure.
Figure 2:
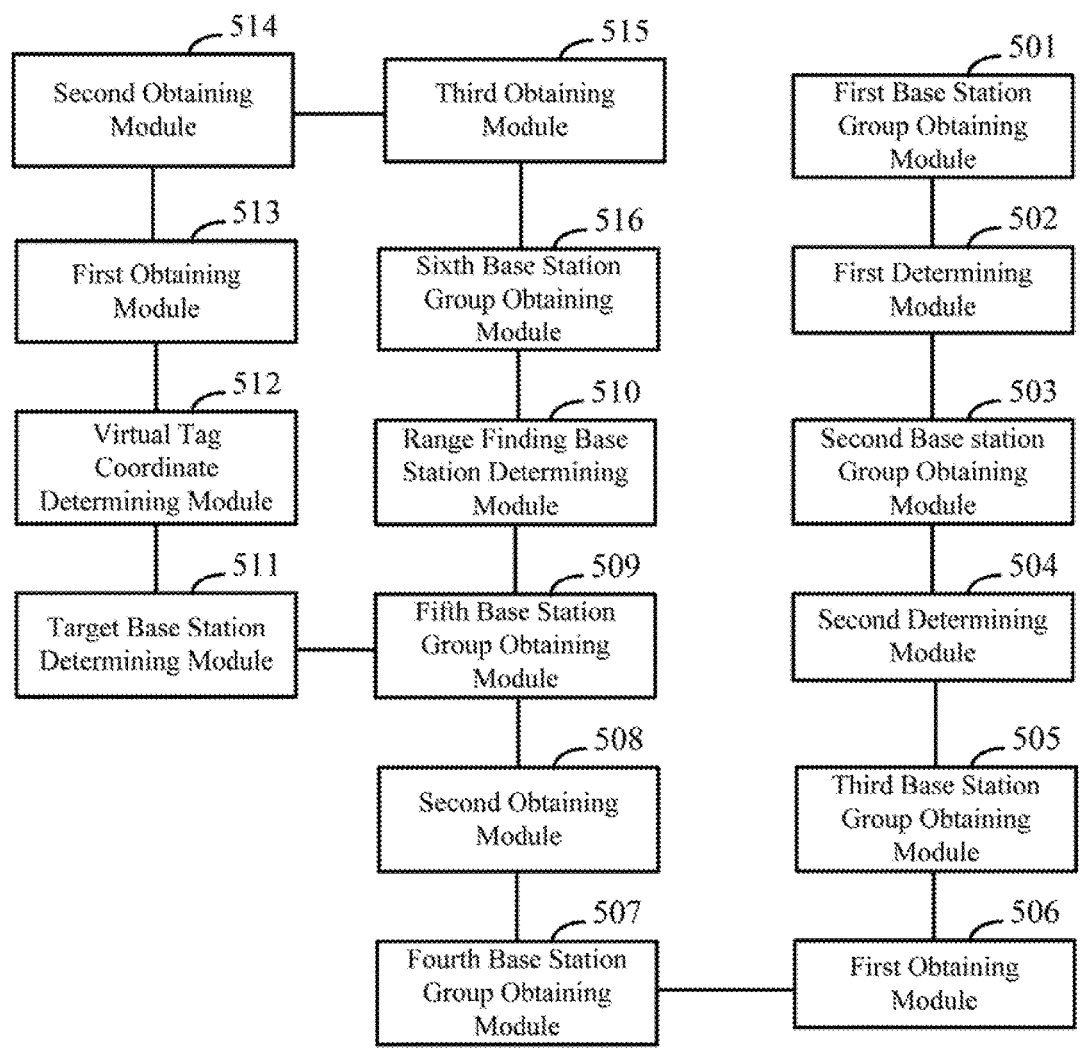
FIG. 2 is a schematic block diagram of the functional blocks of the range finding base station selection apparatus shown in FIG. 1.

FIG. 1 is a schematic diagram of an embodiment of a range finding base station selection apparatus according to the present disclosure. As shown in FIG. 1, in this embodiment, the apparatus 700 may include one or more processors 701, one or more input devices 702, one or more output devices 703, and one or more memories 704. The processor 701, the input device 702, the output device 703, and the memory 704 perform communication with each other via a communication bus 705. The memory 704 is configured to store computer programs including instructions. The processor 701 is configured to execute instructions stored by the memory 704. The processor 701 is configured to call the instructions to perform the following operations. FIG. 2 is a schematic block diagram of the functional blocks of the range finding base station selection apparatus shown in FIG. 1. The apparatus corresponds to a range finding base station selection method (see FIG. 4). For the convenience of description, only parts related to this embodiment are shown. As shown in FIG. 2, the computer program in the memory 704 of the apparatus 700 includes: a first base station group obtaining module 501, a first determining module 502, a second base station group obtaining module 503, a second determining module 504, a third base station group obtaining module 505, a first obtaining module 506, a fourth base station group obtaining module 507, a second obtaining module 508, a fifth base station group obtaining module 509, and a range finding base station determining module 510, where the modules include the instructions. In this embodiment, the apparatus is applied to a wireless positioning system including a server, a plurality of base stations, and one or more tags which communicate with each other in a wireless manner (i.e., via a wireless communicates protocol), in which the position of each base station is fixed, and each tag finds range with respect to its surrounding base stations. The apparatus may be the server itself or a component of the server. A frame including the result of the range finding, that is, a base station identification of each surrounding base station and a base station distance from the tag to the surrounding base station is transmitted to the server by the tag or the base station. The position of each tag is calculated based on the position and the base station distance of its surrounding base stations.

The first base station group obtaining module 501 is configured to obtain a first base station group, where the first base station group comprises a plurality of base stations that have been successfully finding range with respect to a pending tag.

The first determining module configured 502 is to determine whether a first distance between every two base stations in the first base station group is less than a first preset value.

The second base station group obtaining module 503 is configured to discard any one of the two base stations in the first base station group having the first distance less than the first preset value to obtain a second base station group, if the two base stations in the first base station group have the first distance less than the first preset value.

The second determining module 504 is configured to determine whether a horizontal projection of every three base stations in the second base station group being in a straight line, if an amount of the base stations in the second base station group is not less than a first preset base station amount.

The third base station group obtaining module 505 is configured to discard any one of the three base stations in the second base station group having the horizontal projection in the straight line to obtain a third base station group, it the three base stations in the second base station group have the horizontal projection in the straight line.

The first obtaining module 506 is configured to obtain a second distance of each base station in the third base station group to the pending tag, if an amount of the base stations in the third base station group is not less than the first preset base station amount.

The fourth base station group obtaining module 507 is configured to discard any one of the base stations in the third base station group having an absolute value of a difference between the second distance and a pre-stored third distance exceeding a first preset range to obtain a fourth base station group, if the base station in the third base station group have the absolute value of the difference between the second distance and the pre-stored third distance exceeding the first preset range, where the pre-stored third distance is a distance of the base station to the pending tag in a previous frame.

The second obtaining module 508 is configured to obtain a predicted distance of each base station in the fourth base station group to a predicted coordinate of the pending tag in a current frame based on the predicted coordinate and obtain a real distance of each base station in the fourth base station group to a real coordinate of the pending tag in the current frame based on the real coordinate, if an amount of the base stations in the fourth base station group is not less than the first preset base station amount.

The fifth base station group obtaining module 509 is configured to discard any one of the base station in the fourth base station group having an absolute value of a difference between the predicted distance and the real distance being exceeding a second preset range to obtain a fifth base station group, if the absolute value of the difference between the predicted distance and the real distance exceeds the second preset range.

The range finding base station determining module 510 is configured to determine the base stations in the fifth base station group as range finding base stations for positioning the pending tag, if an amount of the base stations in the fifth base station group is equal to the first preset base station amount.

In one embodiment, in the wireless positioning system, the server communicates with the pending tag to obtain the frame including the base station identification(s) and the base station distance(s) from the pending tag, and forms the first base station group based on the base station identification(s). Each tag finds range with respect to its surrounding base stations once in a while, and transmits a frame including the result of the range finding, that is, a base station identification of each surrounding base station and a base station distance from the tag to the surrounding base station. The current frame refers to the frame of the result of the current range finding, while the previous frame refers to the frame of the result of the last range finding.

As shown in FIG. 2, in an embodiment of the present disclosure, based on the above-mentioned embodiment, the apparatus further includes: a target base station determining module 511, a virtual tag coordinate determining module 512, a first obtaining module 513, a second obtaining module 514, a third obtaining module 515, and a sixth base station group obtaining module 516.

The target base station determining module 511 is configured to determine any one of the base stations in the fifth base station group as a target base station, if an amount of the base stations in the fifth base station group exceeds the first preset base station amount;

The virtual tag coordinate determining module 512 is configured to determine a coordinate of a virtual tag by using a preset algorithm based on all the non-target base stations in the fifth base station group;

The first obtaining module 513 configured to obtain a virtual distance of a coordinate of the target base station to the virtual tag and a fourth distance of the target base station to the pending tag;

The second obtaining module 514 is configured to obtain an outlier determination value of an absolute value of a difference between the fourth distance and the virtual distance of the target base station;

The third obtaining module 515 is configured to obtain an outlier determination value of the target base station having the largest outlier determination value among all the target base stations in the filth base station group; and The sixth base station group obtaining module 516 is configured to discard the target base station having the largest outlier determination value exceeding a third preset range to obtain a sixth base station group, if the outlier determination value of the target base station having the largest outlier determination value exceeds the third preset range;

The range finding base station determining module 510 is further configured to determine the base stations in the sixth base station group as the range finding base stations for positioning the pending tag, in response to an amount of base stations in the sixth base station group being less than or equal to an second preset base station amount and being not less than the first preset base station amount.

As shown in FIG. 2, in an embodiment of the present disclosure, based on the above-mentioned embodiment, the apparatus further includes:

a re-processing module 517 configured to: take the sixth base station group as a new fifth base station group, in response to an amount of the base stations in the sixth base station group being larger than the second preset base station amount; and re-execute the steps of determining any one of the base stations in the fifth base station group as a target base station; determining a coordinate of a virtual tag by using a preset algorithm based on all the non-target base stations in the fifth base station group; obtaining a virtual distance of a coordinate of the target base station to the virtual tag, and obtaining a fourth distance of the target base station to the pending tag; obtaining an outlier determination value of an absolute value of a difference between the fourth distance and the virtual distance of the target base station; obtaining an outlier determination value of the target base station having the largest outlier determination value among all the target base stations in the fifth base station group; and discarding the target base station having the largest outlier determination value exceeding a third preset range to obtain a sixth base station group, in response to the outlier determination value of the target base station having the largest outlier determination value exceeding the third preset range.

Figure 3:
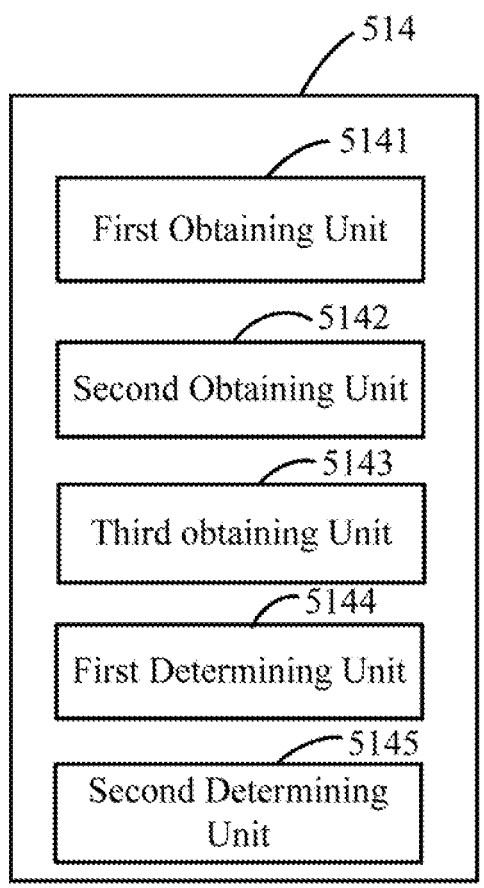
FIG. 3 is a schematic block diagram of another embodiment of a range finding base station selection apparatus according to the present disclosure.

FIG. 3 is a schematic block diagram of another embodiment of a range finding base station selection apparatus according to the present disclosure. As shown in FIG. 3, in an embodiment of the present disclosure, based on the above-mentioned embodiment, the second determining module 514 includes:

a first obtaining unit 5141 configured to obtain a projection coordinate of any three base stations in the second base station group on a horizontal plane to respectively marked as a first base station coordinate $(x_1, y_1)$, a second base station coordinate $(x_2, y_2)$, and a third base station coordinate $(x_3, y_3)$;

a second obtaining unit 5142 configured to obtain a second slope value $d_2=(y_2-y_1)/(x_2-x_1)$ of the first base station coordinate and the second base station coordinate;

a third obtaining unit 5143 configured to obtain a first slope value $d_1=(y_3-y_2)/(x_3-x_2)$ of the second base station coordinate and the third base station coordinate;

a first determining unit 5144 configured to determine the three base stations being not in the straight line, if an absolute value of a difference between the first slope value and the second slope value $|d_1-d_2|$ is less than a preset slope value; and a second determining unit 5145 configured to determine the three base stations being in the straight line, if the absolute value of the difference between the first slope value and the second slope value $|d_1-d_2|$ is greater than or equal to the preset slope value.

The processor 701 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may be any conventional processor.

The input device 702 may include a touch panel, a fingerprint sensor (for collecting fingerprint information of the user and direction information of the fingerprint), a microphone, and the like, and the output device 703 may include a display (LCD or the like), a speaker, and the like.

The memory 704 can include read only memory and random access memory and provides instructions and data to the processor 701. A portion of the memory 704 can also include a non-volatile random access memory. For example, the memory 704 can also store information of the device type.

In a specific implementation, the processor 701, the input device 702, and the output device 703 described in the embodiments of the present disclosure may implement the implementation of the present disclosure.

In a specific implementation, the processor 701, the input device 702, and the output device 703 in this embodiment may perform the first embodiment and the implementation manner described in the second embodiment of the method provided by this embodiment. The implementation manner of the terminal described in this embodiment may also be implemented, and details are not described herein again.

Figure 4:
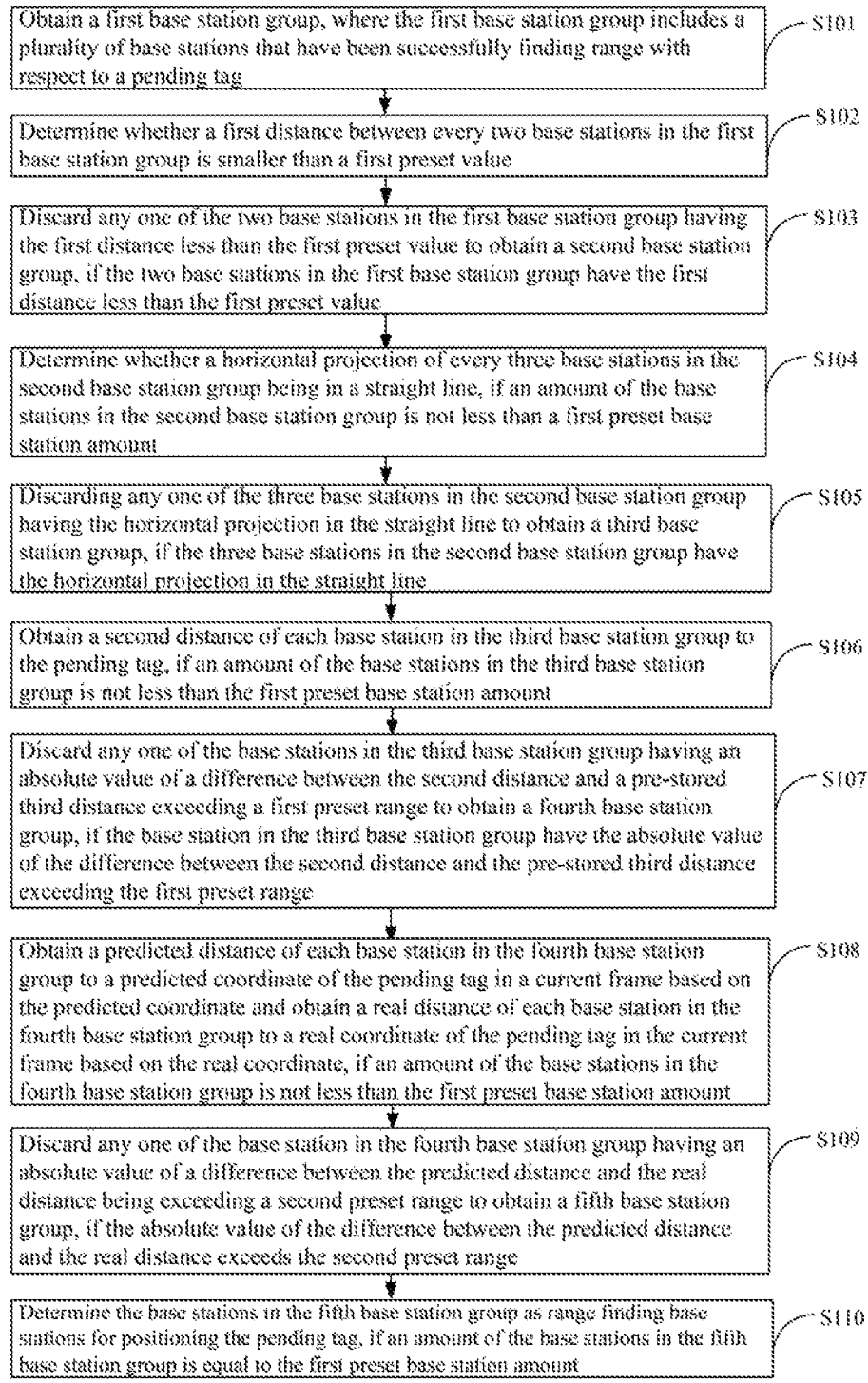
FIG. 4 is a flow chart of an embodiment of a range finding base station selection method according to the present disclosure.

FIG. 4 is a flow chart of an embodiment of a range finding base station selection method according to the present disclosure. In this embodiment, the method is a computer-implemented method executable for a processor. The method is implemented through a wireless positioning system including a server, a plurality of base stations, and one or more tags which communicate with each other in a wireless manner (i.e., via a wireless communicates protocol), in which the position of each base station is fixed, and each tag finds range with respect to its surrounding base stations. A frame including the result of the range finding, that is, a base station identification of each surrounding base station and a base station distance from the tag to the surrounding base station is transmitted to the server by the tag or the base station. The position of each tag is calculated based on the position and the base station distance of its surrounding base stations. The method may be performed by a processor of the server of the wireless positioning system. As shown in FIG. 4, the method includes the following steps.

S101: obtaining a first base station group, where the first base station group includes a plurality of base stations that have been successfully finding range with respect to a pending tag.

In one embodiment, in the wireless positioning system, the server communicates with the pending tag to obtain the frame including the base station identification(s) and the base station distance(s) from the pending tag, and forms the first base station group based on the base station identification(s). In other embodiment, the first base station group may be formed by the pending tag based on the base station identification(s), and the pending tag may provide the frame including the first base station group.

In this embodiment, the pending (to-be-determined) tag may be a moveable tag, which may be a UWB (ultra wideband) positioning device (e.g., a UWB tag) and may be installed on a robot car other mobile terminals. The base station (e.g., a UWB positioning base station) that has been successfully finding range with respect to the pending tag may be a base station within a certain range near the tag. Generally, the tag establishes a connection with the base station in two ways. One way is that the base station broadcasts a signal periodically while the address identifier of the base station is included in the broadcasted signal, and the tag records the address identifier in response to receiving the broadcasted signal; the other way is that the tag broadcasts a signal periodically, the nearby base station replies response information in response to receiving the broadcasted signal while the response information includes the address identifier of the base station, and the tag records the address identifier of the base station in response to receiving the response information. In other embodiments, the pending tag may be a Bluetooth tag, a WiFi tag, or a ZigBee tag, while the base station may be a Bluetooth base station, a WiFi base station, or a ZigBee base station.

S102: determining whether a first distance between every two base stations in the first base station group is less than a first preset value.

In this embodiment, for all the base stations that have been successfully finding range with respect to the pending tag, the combinations of every two base stations in the first base station group are traversed to calculate the distance of the two base stations. The first preset value can be set according to actual needs.

S103: discarding any one of the two base stations in the first base station group having the first distance less than the first preset value to obtain a second base station group, if the two base stations in the first base station group have the first distance less than the first preset value.

In this embodiment, the combinations of every two base stations in the first base station group are traversed. If the first distance of the two base stations is less than the first preset value, which indicates that the two base stations are too near, and one of the two base stations in any combination is discarded.

S104: determining whether a horizontal projection of every three base stations in the second base station group being in a straight line, if an amount of the base stations in the second base station group is not less than a first preset base station amount.

In this embodiment, the first preset base station amount is generally three, since the base station group having less than three base stations cannot realize the positioning of the pending tag. Specifically, whether the horizontal projection is in the straight line or not can be determined based on the coordinate of the horizontal projection of each two base stations in every three base stations.

S105: discarding any one of the three base stations in the second base station group having the horizontal projection in the straight line to obtain a third base station group, if the three base stations in the second base station group have the horizontal projection in the straight line.

In this embodiment, if the horizontal projections of the three base stations are in the straight line, which indicates that the positioning of the pending tag cannot be realized through the three base stations, and any one of the three base stations which have the horizontal projection on the straight line is discarded.

S106: obtaining a second distance of each base station in the third base station group to the pending tag, if an amount of the base stations in the third base station group is not less than the first preset base station amount.

In this embodiment, the second distances of each base station to the pending tag are obtained by a range finding means such as a laser range finder, a tape measure, or an UWB (ultra wideband) means.

S107: discarding any one of the base stations in the third base station group having an absolute value of a difference between the second distance and a pre-stored third distance exceeding a first preset range to obtain a fourth base station group, if the base station in the third base station group have the absolute value of the difference between the second distance and the pre-stored third distance exceeding the first preset range, where the pre-stored third distance is a distance of the base station to the pending tag in a previous frame.

In this embodiment, the purpose of this step is to discard the base station having the second distance that is more different from the distance from the base station to the pending tag in the previous frame. The first preset range may be set according to actual needs. Each tag finds range with respect to its surrounding base stations once in a while, and transmits a frame including the result of the range finding, that is, a base station identification of each surrounding base station and a base station distance from the tag to the surrounding base station. The previous frame refers to the frame of the result of the last range finding.

S108: obtaining a predicted distance of each base station in the fourth base station group to a predicted coordinate of the pending tag in a current frame based on the predicted coordinate and obtaining a real distance of each base station in the fourth base station group to a real coordinate of the pending tag in the current frame based on the real coordinate, if an amount of the base stations in the fourth base station group is not less than the first preset base station amount.

In this embodiment, in the process of obtaining the predicted coordinate of the next frame of the pending tag, the motion of the pending tag can be regarded as a uniform motion in a short time. The average moving speed of the pending tag can be calculated through the position of the pending tag of the first n frames. The predicted coordinate of the pending tag is obtained based on the average moving speed of the pending tag and the time interval of the current frame and the previous frame, in which the current frame refers to the frame of the result of the current range finding, while the previous frame refers to the frame of the result of the last range finding.

In other embodiments, the predicted coordinate of the pending tag in the current frame may also be predicted by Kalman filtering.

S109: discarding any one of the base station in the fourth base station group having an absolute value of a difference between the predicted distance and the real distance being exceeding a second preset range to obtain a fifth base station group, if the absolute value of the difference between the predicted distance and the real distance exceeds the second preset range.

In this embodiment, the purpose of this step is to discard the base station having the distance to the predicted coordinate that is more different from the distance to the real coordinate.

S110: determining the base stations in the fifth base station group as range finding base stations for positioning the pending tag, if an amount of the base stations in the fifth base station group is equal to the first preset base station amount.

According to this embodiment, the range finding base station selection method provided by the present disclosure is realized by: obtaining a first base station group; discarding any one of the two base stations in the first base station group having the first distance less than the first preset value to obtain a second base station group in response to there existing the two base stations in the first base station group having the first distance less than a first preset value; discarding any one of the three base stations in the second base station group having the horizontal projection in the straight line to obtain a third base station group in response to there existing the three base stations in the second base station group having the horizontal projection being in a straight line; discarding any one of the base stations in the third base station group having an absolute value of a difference between the second distance and a pre-stored third distance exceeding a first preset range to obtain a fourth base station group in response to there existing the base station in the third base station group having the absolute value of the difference between the second distance and the pre-stored third distance exceeding the first preset range; discarding any one of the base station in the fourth base station group having an absolute value of a difference between the predicted distance and the real distance being exceeding a second preset range to obtain a fan base station group, in response to the absolute value of the difference between the predicted distance and the real distance being exceeding the second preset range; and determining the base stations in the fifth base station group as range finding base stations for positioning the pending tag, in response to an amount of the base stations in the fifth base station group being equal to the first preset base station amount. This embodiment can eliminate the inappropriate base stations so that the range finding from the base station to the tag can be accurate, and the accuracy of tag positioning is improved.

According to this embodiment, the range finding base station selection method provided by the present disclosure is realized by: obtaining a first base station group; discarding any one of the two base stations in the first base station group having the first distance less than the first preset value to obtain a second base station group in response to there existing the two base stations in the first base station group having the first distance less than a first preset value; discarding any one of the three base stations in the second base station group having the horizontal projection in the straight line to obtain third base station group in response to there existing the three base stations in the second base station group having the horizontal projection being in a straight line; discarding any one of the base stations in the third base station group having an absolute value of a difference between the second distance and a pre-stored third distance exceeding a first preset range to obtain a fourth base station group in response to there existing the base station in the third base station group having the absolute value of the difference between the second distance and the pre-stored third distance exceeding the first preset range; discarding any one of the base station in the fourth base station group having an absolute value of a difference between the predicted distance and the real distance being exceeding a second preset range to obtain a fifth base station group, in response to the absolute value of the difference between the predicted distance and the real distance being exceeding the second preset range; and determining the base stations in the fifth base station group as range finding base stations for positioning the pending tag, in response to an amount of the base stations in the fifth base station group being equal to the first preset base station amount. This embodiment can eliminate the inappropriate base stations so that the range finding from the base station to the tag can be accurate, and the accuracy of tag positioning is improved.

Figure 5:
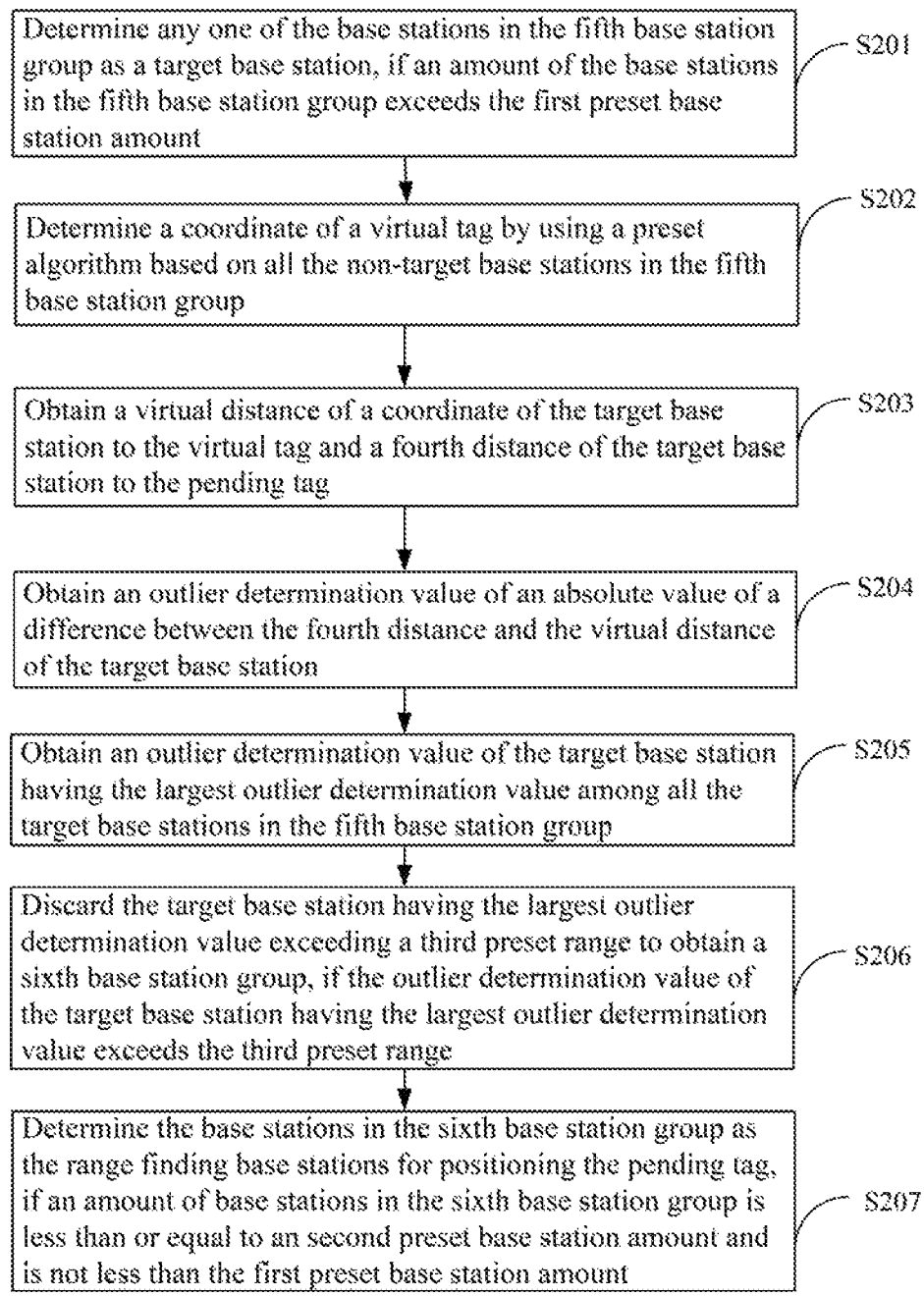
FIG. 5 is a flow chart of another embodiment of a range finding base station selection method according to the present disclosure.

FIG. 5 is a flow chart of another embodiment of a range finding base station selection method according to the present disclosure. As shown in FIG. 5, on the basis of the above-mentioned embodiment, after the step S109, the method further includes the following steps.

S201: determining any one of the base stations in the fifth base station group as a target base station, if an amount of the base stations in the fifth base station group exceeds the first preset base station amount.

In this embodiment, the target base station is any one of the base stations in the fifth base station group.

S202: determining a coordinate of a virtual tag by using a preset algorithm based on ail the non-target base stations in the fifth base station group.

In this embodiment, the preset algorithm may be a triangular centroid method or a least squares method, which is not limited in the present disclosure. The virtual tag refers to a tag derived based on all the remaining non-target base stations by using the above-mentioned preset algorithm.

S203: obtaining a virtual distance of a coordinate of the target base station to the virtual tag and a fourth distance of the target base station to the pending tag.

In this embodiment, the virtual distance refers to the distance of the target base station to the virtual tag. The fourth distance refers to the actual distance of the target base station to the pending tag.

S204: obtaining an outlier determination value of an absolute value of a difference between the fourth distance and the virtual distance of the target base station.

In this embodiment, by obtaining the difference between the fourth distance and the virtual distance and then obtaining the absolute value of the difference, a reference value of determining the distance from the target base station to the base station group is obtained, which is referred to as the outlier determination value. The larger the outlier determination value is, the farther the target base station is from the base station group, and the lesser the reference value of the base station for tag positioning; the less the outlier determination value is, the closer the target base station is front the base station group, and the more the reference value of the base station for tag positioning.

S205. obtaining an outlier determination value of the target base station having the largest outlier determination value among all the target base stations in the fifth base station group.

S206: discarding the target base station having the largest outlier determination value exceeding a third preset range to obtain a sixth base station group, if the outlier determination value of the target base station having the largest outlier determination value exceeds the third preset range.

In this embodiment, the third preset range may be set according to actual needs, for example, may be 3 times of the range finding error. The purpose of this step is to discard the base stations that are significantly deviating from the base station group.

S207: determining the base stations in the sixth base station group as the range finding base stations for positioning the pending tag, if an amount of base stations in the sixth base station group is less than or equal to an second preset base station amount and is not less than the first preset base station amount.

In this embodiment, the second preset base station amount may be 4.

According to this embodiment, the above-mentioned method provided by the present disclosure is realized by: obtaining a virtual distance of a coordinate of the target base station to the virtual tag and a fourth distance of the target base station to the pending tag as well as an outlier determination value of an absolute value of a difference between the fourth distance and the virtual distance of the target base station; and discarding the target base station having the largest outlier determination value exceeding a third preset range to obtain a sixth base station group, in response to the outlier determination value of the target base station having the largest outlier determination value exceeding the third preset range. This embodiment can exclude the base stations that are significantly deviated from the base station group, and can further improve the accuracy of tag positioning.

FIG. 6 is a flow chart of still another embodiment of a range finding base station selection method according to the present disclosure. As shown in FIG. 6, on the basis of the above-mentioned embodiment, after the step S206, the method further includes the following steps.

S301: taking the sixth base station group as a new fifth base station group, if an amount of the base stations in the sixth base station group is larger than the second preset base station amount.

S302: re-executing the steps of determining any one of the base stations in the fifth base station group as a target base station; determining a coordinate of a virtual tag by using a preset algorithm based on all the non-target base stations in the fifth base station group; obtaining a virtual distance of a coordinate of the target base station to the virtual tag, and obtaining a fourth distance of the target base station to the pending tag; obtaining an outlier determination value of an absolute value of a difference between the fourth distance and the virtual distance of the target base station; obtaining an outlier determination value of the target base station having the largest outlier determination value among all the target base stations in the fifth base station group; and discarding the target base station having the largest outlier determination value exceeding a third preset range to obtain a sixth base station group, if the outlier determination value of the target base station having the largest outlier determination value exceeds the third preset range.

It can be seen from the embodiment that, if the amount of the base stations in the sixth base station group is larger than the second preset base station amount, the sixth base station group is taken as the new fifth base station group, and the steps of excluding the base stations that significantly deviate from the base station group are re-executed, which can further exclude the base stations in the sixth base station group that are deviating from the base station group so as to improve the accuracy of the positioning of the pending tag.

Figure 7:
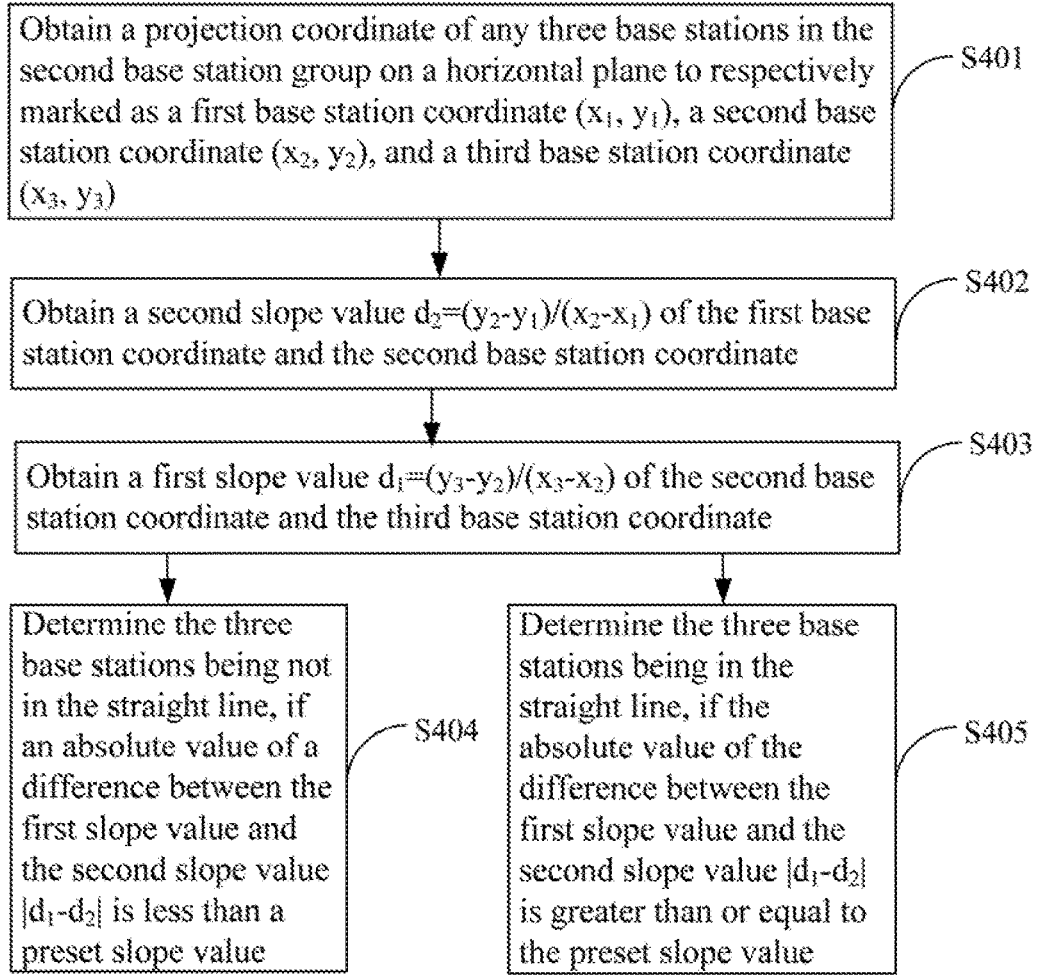
FIG. 7 is a flow chart of the other embodiment of a range finding base station selection method according to the present disclosure.

FIG. 7 is a flow chart of the other embodiment of a range finding base station selection method according to the present disclosure. As shown in FIG. 7, on the basis of the above-mentioned embodiment, in the step S104, the step of determining whether the horizontal projection of every three base stations in the second base station group is in the straight line specifically includes the following steps.

S401: obtaining a projection coordinate of any three base stations in the second base station group on a horizontal plane to respectively marked as a first base station coordinate $(x_1, y_1)$, a second base station coordinate $(x_2, y_2)$, and a third base station coordinate $(x_3, y_3)$.

In this embodiment, the order of the first base station coordinate, the second base station coordinate, and the third base station coordinate is not limited.

S402: obtaining a second slope value $d_2=(y_2-y_1)/(x_2-x_1)$ of the first base station coordinate and the second base station coordinate.

S403: obtaining a first slope value $d_1=(y_3-y_2)/(x_3-x_2)$ of the second base station coordinate and the third base station coordinate.

S404: determining the three base stations being not in the straight line, if an absolute value of a difference between the first slope value and the second slope value $|d_1-d_2|$ is less than a preset slope value.

In this embodiment, the preset slope value can be set according to actual needs.

S405: determining the three base stations being in the straight line, if the absolute value of the difference between the first slope value and the second slope value $|d_1-d_2|$ is greater than or equal to the preset slope value.

It can be seen from the embodiment that, by comparing the difference between the slope values of every two coordinates of the projection coordinate of any three base stations on the horizontal plane and the preset slope value, the accurate determination of whether the projection coordinate of the three base stations on the horizontal plane is in the straight line can be realized.

In an embodiment of the present disclosure, if the amount of the base stations in the second base station group is less than the first preset base station amount, it returns to the step of obtaining the first base station group; if the amount of the base stations in the third base station group is less than the first preset base station amount, it returns to the step of obtaining the first base station group; if the amount of the base stations in the fourth base station group is less than the first preset base station amount, it returns to the step of obtaining the first base station group; and if the amount of the base stations in the fifth base station group is less than the first preset base station amount, it returns to the step of obtaining the first base station group.

By determining whether the amount of the base stations in the base station group is less than the minimum value of the first preset base amount, the case that the positioning of the pending tag will be inaccurate when the amount of base stations is insufficient can be prevented.

It should be understood that, the sequence of the serial number of the steps in the above-mentioned embodiments does not mean the execution order while the execution order of each process should be determined by its function and internal logic, which should not be taken as any limitation to the implementation process of the embodiments.

In another embodiment of the present disclosure, a non-transitory computer-readable storage medium is provided. The non-transitory computer-readable storage medium stores a computer program including program instructions. All or part of the processes in the method for implementing the above-mentioned embodiments of the present disclosure are implemented when the program instructions are executed by the processor, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The non-transitory computer-readable storage medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the non-transitory computer readable storage medium may be appropriately increased or decreased according to the requirements of legislation and patent practice in the jurisdiction. For example, in some jurisdictions, according to the legislation and patent practice, a non-transitory computer readable storage medium does not include electric carrier signals and telecommunication signals.

The computer storage medium may be an internal storage unit of the terminal device of any of the above-mentioned embodiment, for example, a hard disk or a memory of the terminal device. The computer storage medium may also be an external storage device of the terminal device, for example, a plug-in hard disk, a smart media card (SMC), a secure digital (SD) card, flash card, and the like, which is equipped on the terminal device. Furthermore, the computer storage medium may further include both an internal storage unit and an external storage device, of the terminal device. The computer storage medium is configured to store the computer program and other programs and data required by the terminal device. The computer storage medium may also be used to temporarily store data that has been or will be output.

In the above-mentioned embodiments, the description of each embodiment has its focuses, and the parts which are not described or mentioned in one embodiment may refer to the related descriptions in other embodiments. Those ordinary skilled in the art may clearly understand that, the exemplificative units and steps described in the embodiments disclosed herein may be implemented through electronic hardware, computer software, or a combination of the two. In order to clearly illustrate the interchangeability of hardware and software, the composition and steps of the examples have been generally described in terms of functions in the above-mentioned description.

Those skilled in the art may clearly understand that, for the convenience and simplicity of description, for the specific operation process of the above-mentioned terminal device and units, reference may be made to the corresponding processes in the above-mentioned method embodiments, and are not described herein.

In the embodiments provided by the present disclosure, it should be understood that the disclosed terminal device and method may be implemented in other manners. For example, the above-mentioned apparatus embodiment is merely exemplary. For example, the division of units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, the functional units in each of the embodiments may be integrated in one processing unit, or each unit may exist alone physically, or two or more units may be integrated in one unit. The above-mentioned integrated unit may be implemented in the form of hardware or in the form of software functional unit.

The forgoing is only the specific embodiment of the present disclosure, while the scope of the present disclosure is not limited thereto. For those skilled in the art, various equivalent modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented range finding base station selection method for a wireless positioning system, wherein the wireless positioning system comprises a server, a plurality of base stations, and one or more tags communicating with each other in a wireless manner, the method comprising executing on a processor of the server in the wireless positioning system the steps of:

obtaining a first base station group, wherein the first base station group comprises a plurality of base stations have been successfully finding range with respect to a pending tag;

determining whether a first distance between every two base stations in the first base station group being less than a first preset value, and discarding any one of the two base stations in the first base station group having the first distance less than the first preset value to obtain a second base station group;

determining whether horizontal projections of every three base stations in the second base station group are in a straight line, in response to an amount of the base stations in the second base station group being not less than a first preset base station amount, and discarding any one of the three base stations in the second base station group having the horizontal projections in the straight line to obtain a third base station group;

obtaining a second distance of each base station in the third base station group to the pending tag, in response to an amount of the base stations in the third base station group being not less than the first preset base station amount, and discarding any one of the base stations in the third base station group having an absolute value of a difference between the second distance and a pie-stored third distance exceeding a first preset range to obtain a fourth base station group wherein the pre-stored third distance is a distance of the base station to the pending tag in a previous frame;

obtaining a predicted distance of each base station in the fourth base station group to a predicted coordinate of the pending tag in a current frame based on the predicted coordinate and obtaining a real distance of each base station in the fourth base station group to a real coordinate of the pending tag in the current frame based on the real coordinate, in response to an amount of the base stations in the fourth base station group being not less than the first preset base station amount;

discarding any one of the base stations in the fourth base station group having an absolute value of a difference between the predicted distance and the real distance being exceeding a second preset range to obtain a fifth base station group; and determining the base stations in the fifth base station group as range finding base stations for positioning the pending tag, in response to an amount of the base stations in the fifth base station group being equal to the first preset base station amount.

2. The computer-implemented range finding base station selection method of claim 1, further comprising:

determining any one of the base stations in the fifth base station group as a target base station, in response to an amount of the base stations in the fifth base station group exceeding the first preset base station amount;

determining a coordinate of a virtual tag by using a preset algorithm based on all the non-target base stations in the fifth base station group;

obtaining a virtual distance of a coordinate of the target base station to the virtual tag and a fourth distance of the target base station to the pending tag;

obtaining an outlier determination value of an absolute value of a difference between the fourth distance and the virtual distance of the target base station;

obtaining an outlier determination value of the target base station having the largest outlier determination value among all the target base stations in the fifth base station group;

discarding the target base station having the largest outlier determination value exceeding a third preset range to obtain a sixth base station group; and determining the base stations in the sixth base station group as the range finding base stations for positioning the pending tag, in response to an amount of base stations in the sixth base station group being less than or equal to an second preset base station amount and being not less than the first preset base station amount.

3. The computer-implemented range finding base station selection method of claim 2, further comprising:

taking the sixth base station group as a new fifth base station group, in response to an amount of the base stations in the sixth base station group being larger than the second preset base station amount;

re-executing the steps of determining any one of the base stations in the fifth base station group as a target base station; determining a coordinate of a virtual tag by using a preset algorithm based on all the non-target base stations in the fifth base station group; obtaining a virtual distance of a coordinate of the target base station to the virtual tag, and obtaining a fourth distance of the target base station to the pending tag; obtaining an outlier determination value of an absolute value of a difference between the fourth distance and the virtual distance of the target base station; obtaining an outlier determination value of the target base station having the largest outlier determination value among all the target base stations in the fifth base station group; and discarding the target base station having the largest outlier determination value exceeding a third preset range to obtain a sixth base station group.

4. The computer-implemented range finding base station selection method of claim 1, wherein the step of determining whether the horizontal projection of every three base stations in the second base station group being in the straight line comprises:

obtaining, a projection coordinate of any three base stations in the second base station group on a horizontal plane to respectively marked as a first base station coordinate $(x_1, y_1)$, a second base station coordinate $(x_2, y_2)$, and a third base station coordinate $(x_3, y_3)$;

obtaining a second slope value $d_2=(y_2-y_1)/(x_2-x_1)$ of the first base station coordinate and the second base station coordinate;

obtaining a first slope value $d_1=(y_3-y_2)/(x_3-x_2)$ of the second base station coordinate and the third base station coordinate;

determining the three base stations being not in the straight line, in response to an absolute value of a difference between the first slope value and the second slope value $|d_1-d_2|$ being less than a preset slope value; and determining the three base stations being in the straight line, in response to the absolute value of the difference between the first slope value and the second slope value $|d_1-d_2|$ being greater than or equal to the preset slope value.

5. The computer-implemented range finding base station selection method of claim 1, wherein:

returning to the step of obtaining the first base station group, in response to the amount of the base stations in the second base station group being less than the first preset base station amount;

returning to the step of obtaining the first base station group, in response to the amount of the base stations in the third base station group being less than the first preset base station amount;

returning to the step of obtaining the first base station group, in response to the amount of the base stations in the fourth base station group being less than the first preset base station amount; and returning to the step of obtaining the first base station group, in response to the amount of the base stations in the fifth base station group being less than the first preset base station amount.

6. A range finding base station selection apparatus for a server of a wireless positioning system, wherein the wireless positioning system comprises the server, a plurality of base stations, and one or more tags communicating with each other in a wireless manner, and the apparatus comprises:

one or more processors;

a memory; and one or more computer programs stored in the memory and executed by the one or more processor, wherein the one or more computer programs comprises:

a first base station group obtaining module configured to obtain a first base station group, wherein the first base station group comprises a plurality of base stations have been successfully finding range with respect to a pending tag;

a first determining module configured to determine whether a first distance between every two base stations in the first base station group being less than a first preset value;

a second base station group obtaining module configured to discard any one of the two base stations in the first base station group having the first distance less than the first preset value to obtain a second base station group;

a second determining module configured to determine whether a horizontal projection of every three base stations in the second base station group being in a straight line, in response to an amount of the base stations in the second base station group being not less than a first preset base station amount;

a third base station group obtaining module configured to discard any one of the three base stations in the second base station group having the horizontal projection in the straight line to obtain a third base station group;

a first obtaining module configured to obtain a second distance of each base station in the third base station group to the pending tag, in response to an amount of the base stations in the third base station group being not less than the first preset base station amount;

a fourth base station group obtaining module configured to discard any one of the base stations in the third base station group having an absolute value of a difference between the second distance and a pre-stored third distance exceeding a first preset range to obtain a fourth base station group, wherein the pre-stored third distance is a distance of the base station to the pending tag in a previous frame;

a second obtaining module configured to obtain a predicted distance of each base station in the fourth base station group to a predicted coordinate of the pending tag in a current frame based on the predicted coordinate and obtaining a real distance of each base station in the fourth base station group to a real coordinate of the pending tag in the current frame based on the real coordinate, in response to an amount of the base stations in the fourth base station group being not less than the first preset base station amount;

a fifth base station group obtaining module configured to discard any one of the base station in the fourth base station group having an absolute value of a difference between the predicted distance and the real distance being exceeding a second preset range to obtain a fifth base station group; and a range finding base station determining module configured to determine the base stations in the fifth base station group as range finding base stations for positioning the pending tag, in response to an amount of the base stations in the fifth base station group being equal to the first preset base station amount.

7. The range finding base station selection apparatus of claim 6, further comprising:

a target base station determining module configured to determine any one of the base stations in the fifth base station group as a target base station, in response to an amount of the base stations in the fifth base station group exceeding the first preset base station amount;

a virtual tag coordinate determining module configured to determine a coordinate of a virtual tag by using a preset algorithm based on all the non-target base stations in the fifth base station group;

the first obtaining module is further configured to obtain a virtual distance of a coordinate of the target base station to the virtual tag and a fourth distance of the target base station to the pending tag;

a second obtaining module configured to obtain an outlier determination value of an absolute value of a difference between the fourth distance and the virtual distance of the target base station;

a third obtaining module configured to obtain an outlier determination value of the target base station having the largest outlier determination value among all the target base stations in the fifth base station group; and a sixth base station group obtaining module configured to discard the target base station having the largest outlier determination value exceeding a third preset range to obtain a sixth base station group;

the range finding base station determining module is further configured to determine the base stations in the sixth base station group as the range finding base stations for positioning the pending tag, in response to an amount of base stations in the sixth base station group being less than or equal to an second preset base station amount and being not less than the first preset base station amount.

8. The range finding base station selection apparatus of claim 7, further comprising:

a re-processing module configured to take the sixth base station group as a new fifth base station group, in response to an amount of the base stations in the sixth base station group being larger than the second preset base station amount; and re-execute the steps of determining any one of the base stations in the fifth base station group as a target base station; determining a coordinate of a virtual tag by using a preset algorithm based on all the non-target base stations in the fifth base station group; obtaining a virtual distance of a coordinate of the target base station to the virtual tag, and obtaining a fourth distance of the target base station to the pending tag; obtaining an outlier determination value of an absolute value of a difference between the fourth distance and the virtual distance of the target base station; obtaining an outlier determination value of the target base station having the largest outlier determination value among all the target base stations in the fifth base station group; and discarding the target base station having the largest outlier determination value exceeding a third preset range to obtain a sixth base station group.

9. The range finding base station selection apparatus of claim 6, wherein the second determining module is configured to:

obtain a projection coordinate of any three base stations in the second base station group on a horizontal plane to respectively marked as a first base station coordinate $(x_1, y_1)$, a second base station coordinate $(x_2, y_2)$, and a third base station coordinate $(x_3, y_3)$;

obtain a second slope value $d_2=(y_2-y_1)/(x_2-x_1)$ of the first base station coordinate and the second base station coordinate;

obtain a first slope value $d_1=(y_3-y_2)/(x_3-x_2)$ of the second base station coordinate and the third base station coordinate;

determine the three base stations being not in the straight line, in response to an absolute value of a difference between the first slope value and the second slope value $|d_1-d_2|$ being less than a preset slope value; and determine the three base stations being in the straight line, in response to the absolute value of the difference between the first slope value and the second slope value $|d_1-d_2|$ being greater than or equal to the preset slope value.

10. The range finding base station selection apparatus of claim 6, further comprising a module configured to:

enable the first base station group obtaining module to obtain the first base station group, in response to the amount of the base stations in the second base station group being less than the first preset base station amount;

enable the first base station group obtaining module to obtain the first base station group, in response to the amount of the base stations in the third base station group being less than the first preset base station amount;

enable the first base station group obtaining module to obtain the first base station group, in response to the amount d the base stations in the fourth base station group being less than the first preset base station amount; and enable the first base station group obtaining module to obtain the first base station group, in response to the amount of the base stations in the fifth base station group being less than the first preset base station amount.

11. The range finding base station selection apparatus of claim 6, wherein the apparatus is included in the server of the wireless positioning system.

12. A non-transitory computer readable storage medium storing one or more programs executable by a processor, wherein the one or more programs comprises:

instructions for obtaining a first base station group, wherein the first base station group comprises a plurality of base stations have been successfully finding range with respect to a pending tag;

instructions for determining whether a first distance between every two base stations in the first base station group being less than a first preset value, and discarding any one of the two base stations in the first base station group having the first distance less than the first preset value to obtain a second base station group;

instructions for determining whether a horizontal projection of every three base stations in the second base station group being in a straight line, in response to an amount of the base stations in the second base station group being not less than a first preset base station amount, and discarding any one of the three base stations in the second base station group having the horizontal projection in the straight line to obtain a third base station group;

instructions for obtaining a second distance of each base station in the third base station group to the pending tag, in response to an amount of the base stations in the third base station group being not less than the first preset base station amount, and discarding any one of the base stations in the third base station group having all absolute value of a difference between the second distance and a pre-stored third distance exceeding a first preset range to obtain a fourth base station group, wherein the pre-stored third distance is a distance of the base station to the pending tag in a previous frame;

instructions for obtaining a predicted distance of each base station in the fourth base station group to a predicted coordinate of the pending tag in a current frame based on the predicted coordinate and obtaining a real distance of each base station in the fourth base station group to a real coordinate of the pending tag in the current frame based on the real coordinate, in response to an amount of the base stations in the fourth base station group being not less than the first preset base station amount;

instructions for discarding any one of the base station in the fourth base station group having an absolute value of a difference between the predicted distance and the real distance being exceeding a second preset range to obtain a fifth base station group; and instructions for determining the base stations in the fifth base station group as range finding base stations for positioning the pending tag, in response to an amount of the base stations in the fifth base station group hung equal to the first preset base station amount.

13. The terminal device non-transitory computer readable storage medium of claim 12, wherein the one or more programs further comprise:

instructions for determining any one of the base stations in the fifth base station group as a target base station, in response to an amount of the base stations in the fifth base station group exceeding the first preset base station amount;

instructions for determining a coordinate of a virtual tag using a preset algorithm based on all the non-target base stations in the fifth base station group;

instructions for obtaining a virtual distance of a coordinate of the target base station to the virtual tag and a fourth distance of the target base station to the pending tag;

instructions for obtaining an outlier determination value of an absolute value of a difference between the fourth distance and the virtual distance of the target base station;

instructions for obtaining an outlier determination value of the target base station having the largest outlier determination value among all the target base stations in the fifth base station group;

instructions for discarding the target base station having the largest outlier determination value exceeding a third preset range to obtain a sixth base station group; and instructions for determining the base stations in the sixth base station group as the range finding base stations for positioning the pending tag, in response to an amount of base stations in the sixth base station group being less than ear equal to an second preset base station amount and being not less than the first preset base station amount.

14. The non-transitory computer readable storage medium of claim 13, wherein the one or more programs further comprise:

instructions for taking the sixth base station group as a new fifth base station group, in response to an amount of the base stations in the sixth base station group being later than the second preset base station amount;

instructions for re-executing the steps of determining any one of the base stations in the fifth base station group as a target base station; determining a coordinate of a virtual tag by using a preset algorithm based on all the non-target base stations in the fifth base station group; obtaining a virtual distance of a coordinate of the target base station to the virtual tag, and obtaining a fourth distance of the target base station to the pending tag; obtaining an outlier determination value of an absolute value of a difference between the fourth distance and the virtual distance of the target base station; obtaining an outlier determination value of the target base station having the largest outlier determination value among all the target base stations in the fifth base station group; and discarding the target base station having the largest outlier determination value exceeding a third preset range to obtain a sixth base station group.

15. The non-transitory computer readable storage medium of claim 12, wherein the instructions for determining whether the horizontal projection of every three base stations in the second base station group being in the straight line comprises:

instructions for obtaining a projection coordinate of any three base stations in the second base station group on a horizontal plane to respectively marked as a first base station coordinate $(x_1, y_1)$, a second base station coordinate $(x_2, y_2)$, and a third base station coordinate $(x_3, y_3)$;

instructions for obtaining a second slope value $d_2=(y_2-y_1)/(x_2-x_1)$ of the first base station coordinate and the second base station coordinate;

instructions for obtaining a first slope value $d_1=(y_3-y_2)/(x_3-x_2)$ of the second base station coordinate and the third base station coordinate;

instructions for determining the three base stations being not in the straight line, in response to an absolute value of a difference between the first slope value and the second slope value $|d_1-d_2|$ being less than a preset slope value; and instructions for determining the three base stations being in the straight line, in response to the absolute value of the difference between the first slope value and the second slope value $|d_1-d_2|$ being greater than or equal to the preset slope value.

16. The non-transitory computer readable storage medium of claim 12, wherein the one or more programs further comprise:

instructions for returning to the step of obtaining the first base station group, in response to the amount of the base stations in the second base station group being less than the first preset base station amount;

instructions for returning to the step of obtaining the first base station group, in response to the amount of the base stations in the third base station group being less than the first preset base station amount;

instructions for returning to the step of obtaining the first base station group, in response to the amount of the base stations in the fourth base station group being less than the first preset base station amount; and instructions for returning to the step of obtaining the first base station group, in response to the amount of the base stations in the fifth base station group being less than the first preset base station amount.

\* \* \* \* \*